United States Patent [19]

Mucha et al.

[11] 4,090,698

[45] May 23, 1978

[54] METHOD AND APPARATUS OF INDUCTIVELY HEATING ELONGATED WORKPIECES

[75] Inventors: George M. Mucha, Parma Heights; Norbert R. Balzer; Paul L. Day, both of Parma, all of Ohio

[73] Assignee: Park-Ohio Industries, Inc., Cleveland, Ohio

[21] Appl. No.: 802,887

[22] Filed: Jun. 2, 1977

Related U.S. Application Data

[62] Division of Ser. No. 677,981, Apr. 19, 1976, abandoned.

[51] Int. Cl.$^2$ .................... C21D 1/62; C21D 9/08
[52] U.S. Cl. ........................... 266/133; 134/76; 134/83
[58] Field of Search .............. 134/76, 82, 83; 266/129, 130, 131, 132, 133

[56] References Cited

U.S. PATENT DOCUMENTS

| 3,658,197 | 4/1972 | DiDonato | 134/76 X |
| 3,702,693 | 11/1972 | Balzer | 266/129 X |
| 3,854,707 | 12/1974 | Armstrong et al. | 266/129 X |
| 3,970,813 | 7/1976 | Day | 266/129 X |

Primary Examiner—Roy Lake
Assistant Examiner—Paul A. Bell
Attorney, Agent, or Firm—Meyer, Tilberry & Body

[57] ABSTRACT

A device for heating an elongated workpiece having a central axis which device comprises first and second axially spaced and axially aligned multiturn induction heating coils, each of which has a workpiece receiving passage extending therethrough. Means are provided for indexing a workpiece axially first into the passage of the first coil and then, after a time delay, axially into the passage of the second coil. There is also provided a quenching device used with the heating device for the previously heated workpieces which involves moving the workpiece to a first location above the liquid level of a quenching liquid in a tank with the axis of the workpiece extending in a given direction, shifting the heated workpiece transversely to a second position still above the liquid level, shifting the workpiece vertically downwardly into the quenching liquid of the tank at the second location, rotating the workpiece under the liquid level at a second location, shifting the workpiece transversely to a third location while still under the liquid level, lifting the workpiece vertically upwardly from the quenching liquid to a position above the liquid level, shifting the workpiece transversely to a fourth position still above the liquid level and then moving the workpiece from the tank.

3 Claims, 9 Drawing Figures

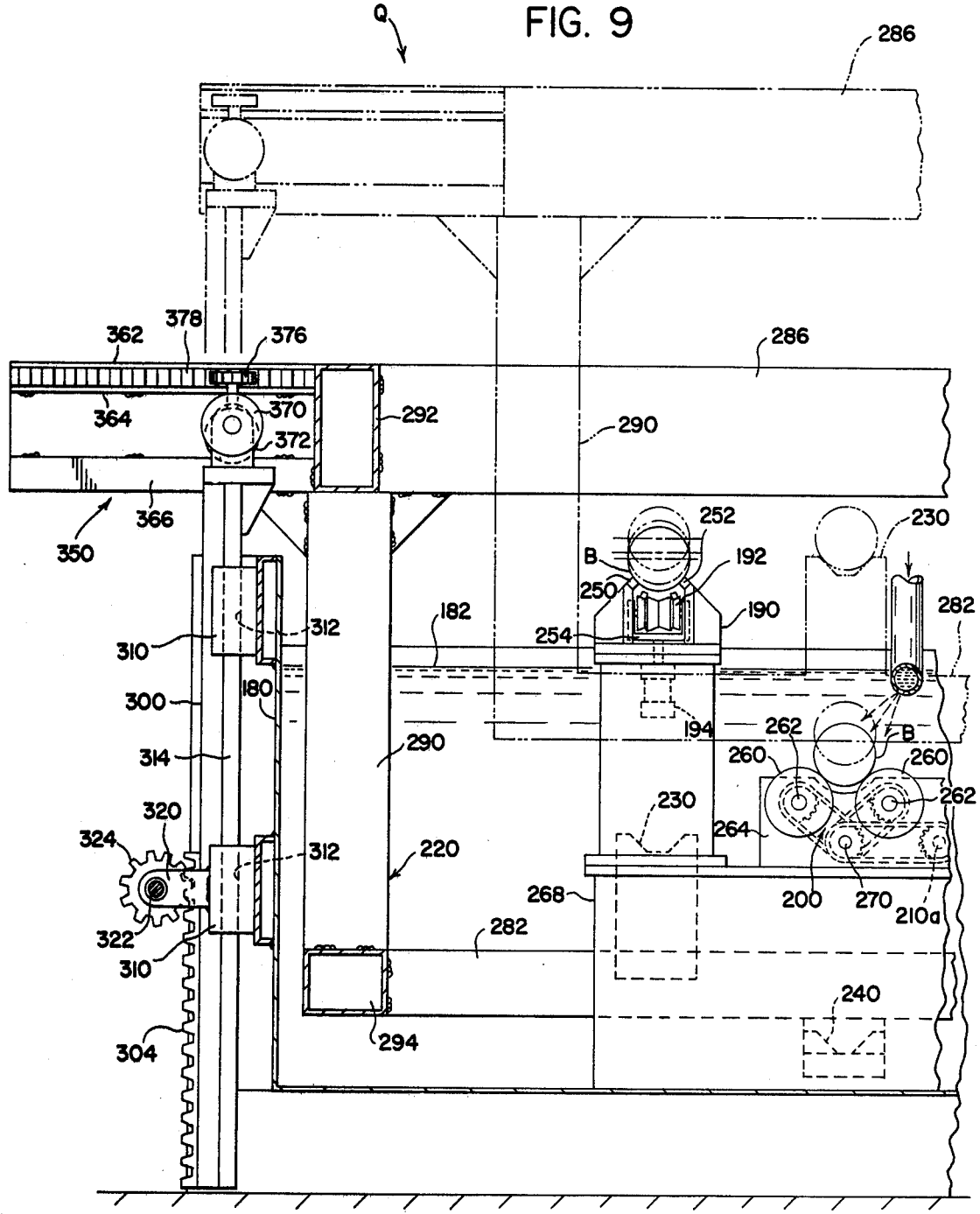

METHOD AND APPARATUS OF INDUCTIVELY HEATING ELONGATED WORKPIECES

This is a division of application Ser. No. 677,981 filed Apr. 19, 1976, now abandoned.

The present invention relates to the art of induction heating and, more particularly, to an improved method and apparatus of inductively heating an elongated workpiece preparatory to quench hardening.

The invention is particularly applicable for inductively heating hollow cylindrical bodies, such as cartridges for projectiles, preparatory to quench hardening and it will be described with particular reference thereto; however, it is appreciated that the invention has much broader applications and may be used in inductively heating and/or quench hardening various elongated workpieces.

BACKGROUND OF INVENTION

In the manufacture of ammunition cartridges, it is necessary to heat the cartridges to a hardening temperature and then quench harden the cartridges. Thereafter the cartridges are tempered to the desired hardness. A variety of apparatus has been developed for this purpose. Generally, the cartridges are heated in a gas fired furnace. Thereafter they are removed and quench hardened in a tank. From the tank, the workpieces are again heated to a tempering or annealing temperature. This type of procedure requires a substantial amount of handling and reorientation of the cartridges between the three basic processing steps. As is well known, induction heating is considered a more acceptable form of heating when applicable. Thus, attempts have been made to inductively heat the cartridges by using multiturn coils. A cartridge is first placed in the coil and heated inductively. Then the cartridge is removed for quench hardening. This process is not efficient because the cartridge must be heated from ambient temperature to the hardening temperature in a single induction heating coil. To overcome this problem, other similar workpieces have been heated by a series of axially aligned multiturn coils. The workpiece is progressively neated as it is progressively moved through the individual coils. In this manner, each coil performs a certain amount of the heating operation on the progressively moving workpieces. In some prior induction heating units, the workpieces are in abutting relationship and periodically advanced through successive multiturn coils. These processes cannot be used effectively for cartridges since the cartridges are often made of a material which can be marked and defaced by sliding along rails through the axially aligned multiturn coils. Also, abutment of cartridges can cause damage at the ends, as well as possible uneven heating. There are spaces between successive coils in which there is no heating effect; therefore, fluctuations in the heated temperature of the workpieces can occur between two adjacent coils.

STATEMENT OF INVENTION

The present invention relates to an apparatus for inductively heating elongated workpieces, such as ammunition cartridge cases for projectiles, which device uses induction heating and does not tend to damage the surface of the cartridge cases as they are heated to an elevated temperature and progressed through the induction heating apparatus and which allows uniform heating.

In accordance with the present invention, there is provided a device for heating an elongated workpiece, such as a cartridge case, having a central axis. This device comprises first and second axially spaced and axially aligned multiturn induction heating coils, each of which has a workpiece receiving passage extending therethrough. The invention includes means for indexing a workpiece axially first into the passage of the first coil and then, after a time delay, axially into the passage of the second coil. In this manner, the workpiece is first heated in a first coil and then heated in the second coil. Of course, a number of axially aligned coils can be used for progressively raising the temperature of the workpiece as it progresses axially from coil-to-coil. The workpiece is indexed from coil-to-coil and is not progressively moved during the heating operation. Thus, the alternating current power supply used in energizing the individual coils can operate upon a workpiece at an even temperature. The coil does not have to heat a portion of the workpiece to a greater extent than any other portion as the workpiece progresses through the workpiece receiving passage of the individual coils. By using spaced heating positions with stepping of the workpieces from coil-to-coil, workpieces having varying profiles can be heated uniformly. Also the coils can be contoured to match irregular shapes of workpieces since heating is at a fixed position in a coil.

In accordance with another aspect of the present invention, each of the coils includes two generally fixed workpiece supporting rails extending axially in the passages. A transfer element having a first and second workpiece receiving portion extends generally parallel to the central axis of the coils. Means are provided for moving the transfer element vertically with respect to the fixed rails between an upper vertical position for supporting a workpiece on the transfer element and a lower vertical position below the rails for allowing the parallel rails to support the workpiece. This transfer element is moved axially between a first axial position with the first workpiece receiving portion spaced from the coil and adjacent its entrant end and the second workpiece receiving portion in the passage of the coil and a second axial position with the first workpiece receiving portion in the passage of the coil and the second workpiece receiving portion spaced from the coil adjacent the exit end thereof. In this manner, the indexing of the workpieces through the axially aligned coils is by a lifting motion which lifts the workpieces from the support structure of the coils and indexes it into the other coil where it is deposited on the workpiece receiving structure of the second coil. In this manner, indexing is not by pushing the workpieces through the coils. The workpieces are not marred as they progress from coil-to-coil. In addition, the workpieces are located in the center of each of the coils during the heating operation. In this manner, better control can be obtained over the induction heating parameters of each of the coils. The workpieces are not in abutting relationship which can cause damage to the respective ends of the workpieces and uneven heating at the ends.

In accordance with another aspect of the present invention, there is provided a method of inductively heating an elongated workpiece progressively in first and second axially space, aligned multiturn induction heating coils having central passages defining heating zones. This method comprises the steps of shifting a first workpiece axially into the heating zone of the first coil, allowing the first workpiece to be heated while stationary in the heating zone of the first coil, shifting the second workpiece which is axially spaced from the first workpiece, into the heating zone of the first coil while simultaneously shifting the first workpiece into the heating zone of the second coil whereby the first and second workpieces are spaced from each other and heated separately in the heating zones of the first and second coils.

In accordance with another aspect of the present invention, there is provided a novel apparatus for quench hardening an inductively heated, elongated workpiece having a central axis. This apparatus comprises a frame member in a quench tank, the frame member has first, second and third workpiece receiving nests, each of the nests has means for supporting one of the workpieces with its central axis extending in a selected direction and the first and third nest being vertically above the second nest; first conveyor means for feeding a workpiece in the selected direction toward the tank and to a first support pedestal at a first location in the tank, the first support pedestal includes means for supporting a workpiece above the liquid level of the tank; second conveyor means for discharging a workpiece in the selected direction away from the tank and from a second support pedestal at a second location in the tank, the second support pedestal includes means for supporting the workpiece above the liquid level; at least first and second submerged means in the tank spaced between the first and second support pedestals for supporting one of the workpieces with its axis extending in the selected direction; first moving means for shifting the frame member transversely of the second direction between a first horizontal position with the first nest at the first location and the second and third nests each aligned with a submerged means and a second horizontal position with the third nest at the second location and the first and second nest each aligned with a submerged means; a second moving means for shifting the frame member between a first vertical position with the first and third nest above the liquid level and above the support pedestals whereby a workpiece aligned with the first and second nests are raised to a level above the support pedestal and a second vertical position with the nest below the submerged means whereby a workpiece on each of the nests is deposited on a pedestal or submerged means aligned with each of the nests as the second moving means shifts the frame member between the first and second vertical position; and means for causing the first moving means to move from the first horizontal position to the second horizontal position when the frame member is in the first vertical position and means for causing the first moving means to shift from the second horizontal position to the first horizontal position when the frame member is in the second vertical position.

By using this apparatus, the inductively heated elongated workpiece is deposited on the first pedestal. The frame member picks up the workpiece from this pedestal and deposits it on a submerged means which is within the quenching liquid of the tank. This commences the quenching operation. Thereafter, successive workpieces are removed from the first pedestal and put into the tank and supported by a submerged means. Several submerged means can be used and the translation of the frame member shifts each of these workpieces successively between the submerged means. The number of submerged means is determined by indexing time and the cooling capacity of the tank with respect to the temperature of the entering workpieces. In practice, each of the submerged means includes means for rotating the workpieces around their central axes as they are under the liquid level of the tank. This causes agitation and distrubs any air pockets which can develop by creation of steam at the surfaces of the workpieces. At the outlet end of the quench tank, a quenched workpiece is removed from the last submerged means and deposited on an exit pedestal for introduction into an induction heating arrangement similar to the arrangement used in heating the workpieces to the hardening temperature.

The primary object of the present invention is the provision of an apparatus and method of inductively heating an elongated workpiece, which apparatus and method advances a workpiece through successive, axially aligned, multiturn inductors or coils, with each workpiece being in a separate coil.

Another object of the present invention is the provision of an apparatus and method as defined above, which apparatus and method do not require a sliding action between coils and does not cause surface damage to the workpieces, especially at higher temperatures.

Still a further object of the present invention is the provision of an apparatus and method for inductively heating an elongated workpiece, which apparatus and method positions a workpiece in each of the several axially aligned, multiturn induction heating coils so that the load experienced by each coil is temperature balanced to facilitate better control of the energizing system.

Still another object of the present invention is the provision of an apparatus and method for quench hardening an inductively heated, elongated workpiece, which apparatus and method utilizes a quench tank and advances the workpiece through the tank in a series of steps with the workpiece remaining under the level of the liquid within the tank for a sufficient number of cycles to quench the workpiece to the desired temperature.

Another object of the present invention is the provision of an apparatus and method as defined above which apparatus and method maintains control over the workpiece during the quenching operation and can allow rotation of the workpiece about a central axis while submerged in various well defined locations within the quench tank.

These and other objects and advantages will become apparent from the following description taken together with the accompanying drawings.

BRIEF DESCRIPTION OF DRAWINGS

In this application the following drawings are employed.

PREFERRED EMBODIMENT

Figure 1:
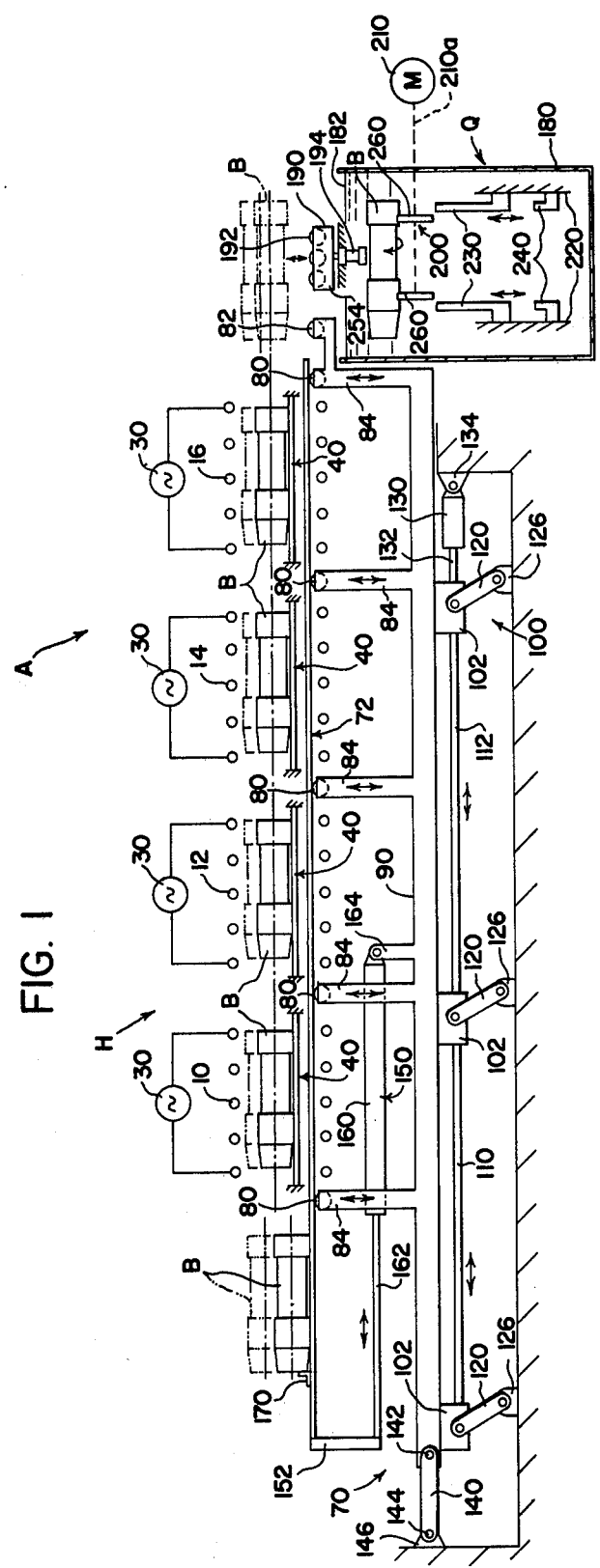
FIG. 1 is a schematic side elevational view showing the preferred embodiment of the present invention.
Figure 2:
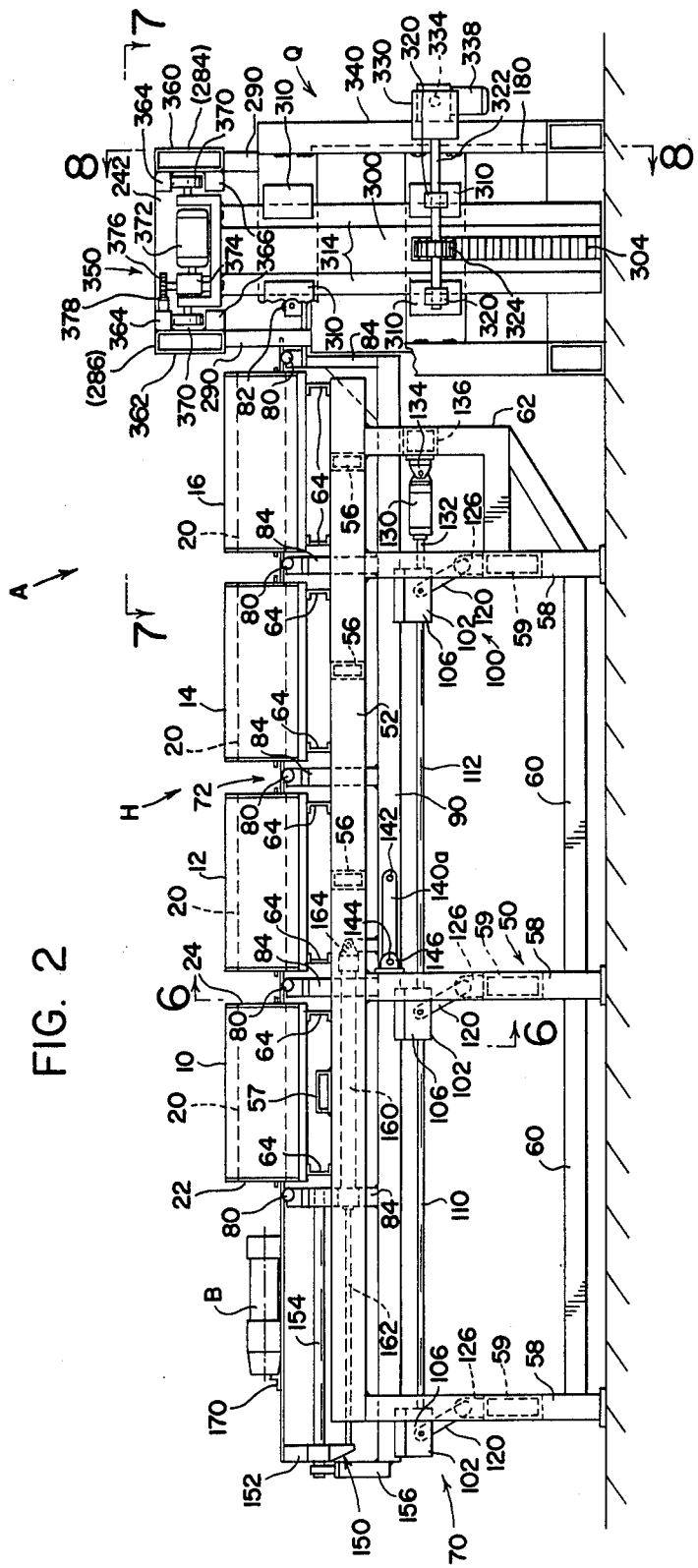
FIG. 2 is a side elevation view, similar to FIG. 1, showing in more detail the preferred embodiment of the present invention.

Referring now to the drawings wherein the showings are for the purpose of illustrating a preferred embodiment of the invention only, and not for the purpose of limiting same, a system A, schematically illustrated in FIG. 1 and shown in more detail in FIG. 2, is used for first inductively heating and then quench hardening a workpiece, such as a steel ammunition cartridge case B. Thereafter, the cartridge case is usually annealed. System A includes a quench heating apparatus H, best shown in FIGS. 2–6, and a quenching apparatus Q, best shown in FIGS. 2, 5 and 7–9. In practice, a second heating apparatus is used for annealing workpiece B after the workpiece has been quench hardened in apparatus Q. Three units are arranged in a U-shaped pattern so that the workpieces enter and exit generally in the same location. Workpiece B is cylindrical and includes a central axis. One end of the workpiece is opened and the other is closed; however, other cylindrical and elongated workpieces can be heated by apparatus H.

INDUCTION HEATING APPARATUS H

Referring now more particularly to the induction heating apparatus H schematically illustrated in FIG. 1 and illustrated in more detail in the subsequent Figures, this apparatus includes a plurality of axially aligned, multiturn induction heating coils, four of which are employed in the preferred embodiment as coils 10, 12, 14 and 16. Since all of these coils are substantially the same, only one coil will be described in detail. This description will apply equally to the other coils. The multiturn induction heating coils each include a central workpiece receiving passage 20 which is generally cylindrical and has an internal diameter slightly larger than the external diameter of workpiece B. Each coil includes an entrant end 22 and an exit end 24 and is covered by a ceramic material in accordance with standard induction heating practice. Alternating current power supplies 30 are used to energize each of the individual coils 10–16. In practice, only one power supply may be used and the coils may be connected in electrical series or electrical parallel to this single power supply. The frequency of the power supply is determined by available equipment and the desired heating to be effected in the workpiece B. Since the workpiece is hollow in the preferred embodiment, a relatively high frequency can be used for energizing the individual induction heating coils. Each coil includes support means 40 which are, in the illustrated embodiment, parallel, axially extending support rails 42, 44 which will support a workpiece B in a generally centered position within the coil. The support the coils with their workpiece receiving passageways axially aligned, there is provided a fixed frame 50 which may take a variety of structural designs. In the illustrated embodiment, longitudinally extending upper beams 52, 54 are connected by transverse beams 56, 57 and are supported on vertically extending posts 58. Cross beam 59 and longitudinally extending supports 60 fixedly secure the post 58 in the desired position. A bracket 62 at the exit end of apparatus H and generally below coil 16 is provided for a purpose to be described later. Each of the coils is fixedly secured onto longitudinal beams 52, 54 by transversely extending coil support elements 64, eight of which are shown. By this structure, coils 10–16 are supported in alignment for successively heating workpieces B in the center positions, or heating zones, of the respective coils.

To transfer workpieces B from an entrant position at the left, to the center position of each successive coil, there is provided a transfer mechanism 70 which includes a longitudinally extending transfer element 72 extending through all passages 20 of coils 10–16. This transfer element may take a variety of configurations; however, in accordance with one aspect of the invention, the transfer element is two generally parallel, longitudinally or axially extending transfer rails 74, 76 supported on transversely spaced rollers 80 located adjacent the exit and entrant ends of each of the coils. A second set of rollers 82 are used to support parallel rails 74, 76 as they are shifted from left to right in FIG. 2. Rollers 80 are supported on upwardly extending columns 84 which are fixed on a movable frame 90 which can be shifted between two vertical positions for alternately supporting the workpieces on rails 72, 74 and on the workpiece supporting rails 42, 44 in the various coils.

Figure 3:
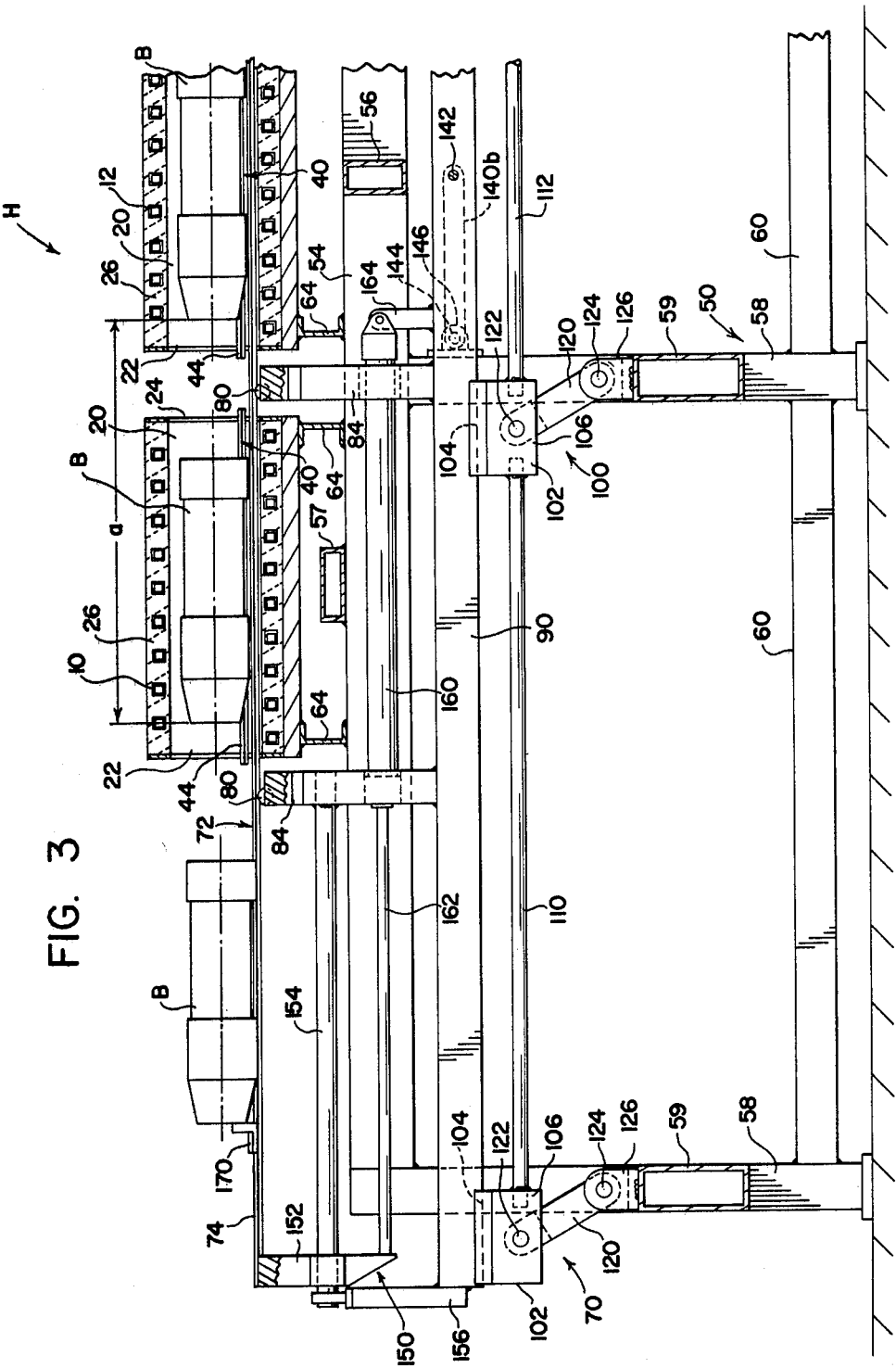
FIG. 3 is an enlarged, partial view showing, somewhat in cross-section, a portion of the preferred embodiment, as shown in FIG. 2.
Figure 4:
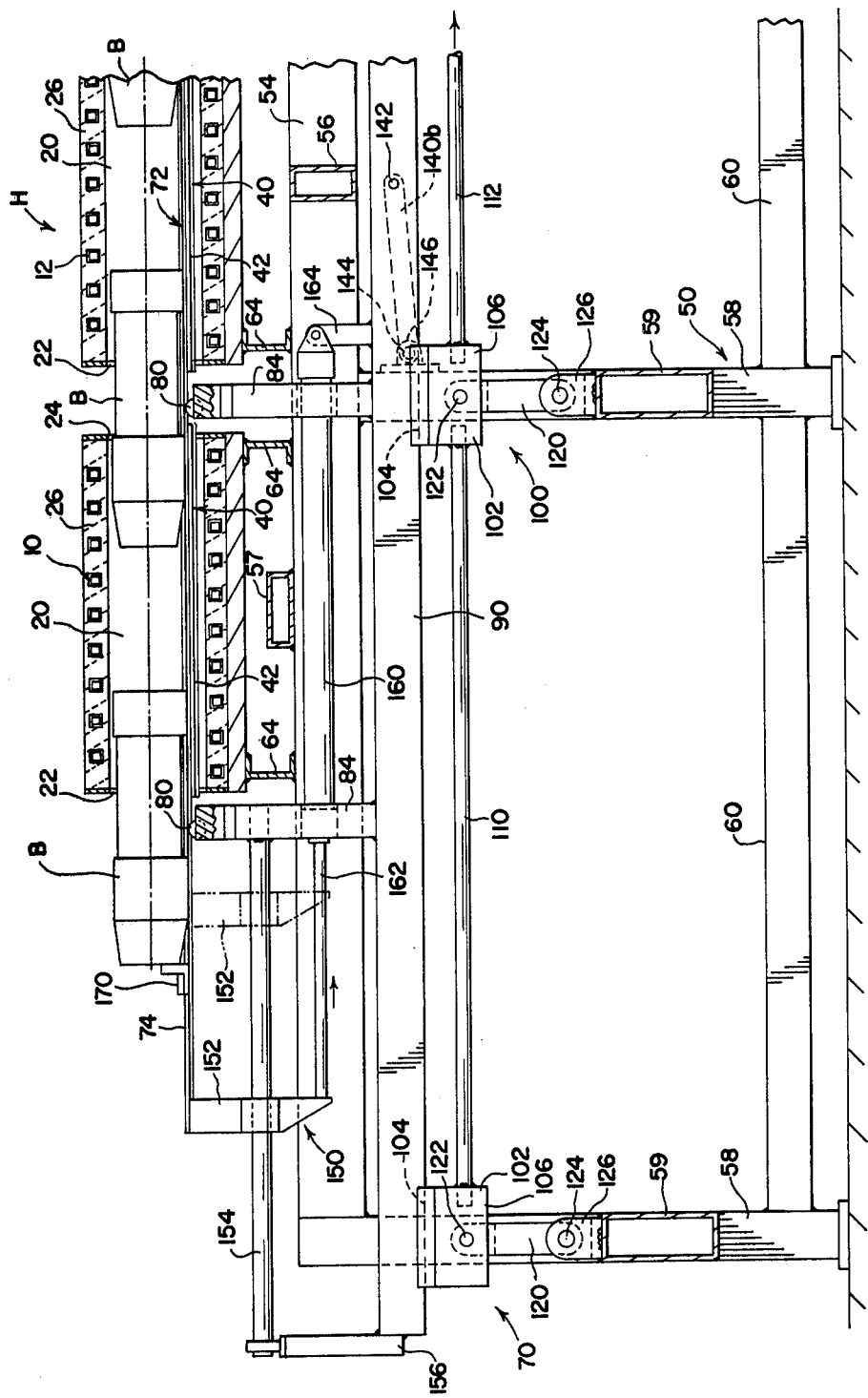
FIG. 4 is a partial, enlarged view similar to FIG. 3 showing a different operating position of the preferred embodiment.
Figure 6:
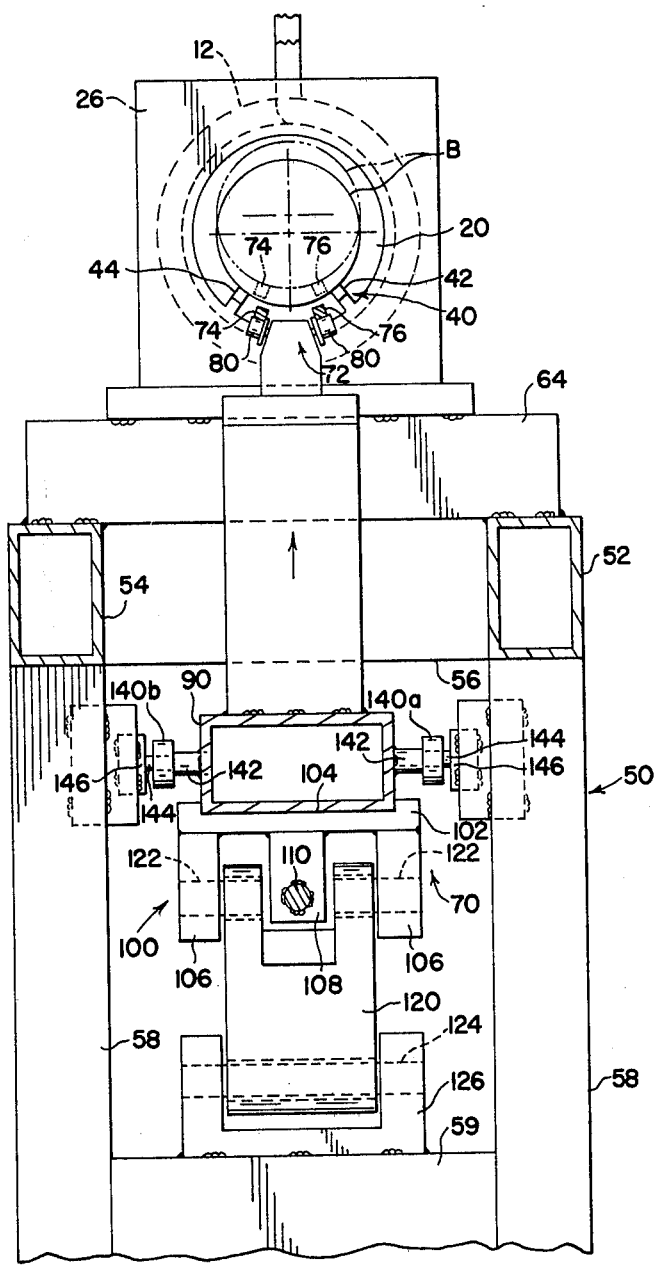
FIG. 6 is an enlarged, partial cross-sectional view taken generally along line 6—6 of FIG. 2.

A variety of structures could be used for shifting frame 90 between the two vertical positions; however, in the illustrated embodiment, the vertical shifting device 100 includes three slide blocks 102, as best shown in FIG. 6. An upper recess 104 slidably engages the under side of the longitudinally extending frame 90. Sidewalls 106 and an intermediate wall 108 depend downwardly from slide block 102. Rods 110, 112 fix slide blocks 102 in the longitudinal position shown in FIG. 2, so that the blocks move in unison left-to-left. Pivotally mounted links 120 extend between pins 122 of block 102 and pin 124 supported in trunnion 126 supported upon the fixed frame 50 at the center cross beam 59. By providing the necessary length for links 120, movement of slide blocks 102 raises and lowers frame 90, as best shown in FIGS. 3 and 4. This movement is effected by a cylinder 130 having a reciprocal rod 132. Cylinder 130 is supported by a trunnion 134 on beam 136 which is attached to bracket 62. In operation, as rod 132 is shifted horizontally, slide blocks 102 are shifted vertically downwardly, as shown in FIG. 3, to allow workpieces B to be supported by the support rails 42, 44 in each off the individual coils. When rod 132 is shifted to the right, links 120 force slide blocks 102 upwardly to raise columns 84. This raises transfer rails 74, 76 to a vertical position. The transfer rails now support the individual workpieces. To prevent undue axial displacement of frame 90, there is provided a cenntrally located link 140, shown schematically in FIG. 1 as a single link and in the other Figures as two links 140a, 140b. These links are secured to frame 90 by pivot pins 142 and to fixed frame 50 by pivot pins 144 journalled within fixed trunnions 146. In this manner, vertical movement of blocks 102 shift frame 90 upwardly within a path determined by links 140a, 140b. Of course, other arrangements could be used for vertically shifting frame 90 which carries support rollers 80 for lifting and lowering transfer elements 74, 76.

For shifting rails 74, 76 between two horizontal or axial positions on rollers 80, 82 there is provided a shifting mechanism 150, best shown in FIGS. 2 and 3. This mechanism includes a downwardly extending bracket 152 fixed onto one end of rails 74, 76 and slidably secured onto two or more guide rods 154, only one of which is shown. These guide rods are mounted onto frame 90 by a pillar 156 at one end at the first column 84 at the other end. Cylinder 160 having a movable rod 162 is secured by a trunnion 164 onto frame 90. As cylinder 160 reciprocates rod 162, rails 74, 76 are reciprocated by bracket 142 and move along rollers 80, 82 between two axially spaced positions. One of these positions is shown in FIG. 3 and the other position is shifted to the right a distance $a$ as shown in FIG. 3. A locator abutment 170 is used to locate a workpiece B in the proper position for shifting into the first coil 10. Rails 74, 76 may be joined at spaced locations as long as these junctions do not hinder the operation of the transfer mechanism 70.

In operation, a workpiece is placed upon rails 74, 76 in the position shown in FIG. 2. Rod 132 is then retracted. This raises transfer rails 74, 76 to the phantom line position shown in FIG. 6. In this position, rod 162 can be shifted to the right and shifts a workpiece B into the center position of coil 10. At the same time, each workpiece in the respective coils is shifted to the center of a passage 20 of the next successive coil. When in this second axial position, transfer mechanism 70 is shifted to a downward vertical position shown in solid lines in FIG. 6. This is accomplished by shifting rod 132 to the left in FIG. 2. In the lower vertical position, rod 162 can be extended from cylinder 160 to the position shown in FIG. 2. Thereafter, a new workpiece B is placed into the position shown in FIG. 2 and the cycle is repeated. In this manner, workpieces are shifted from one coil to the other after a time delay determined by the necessary time for heating the workpieces in the individual coils. The workpieces do not contact each other and are heated in the center position of each of the successive coils which is an electrically efficient arrangement. There is no heating by the terminal positions of the coils, since the workpieces have a length less than the length of passages 20. After successively progressing from coil 10 to coil 16, the workpieces are then transferred from heating apparatus H to quenching apparatus Q. The workpieces have been heated to a quench hardening temperature determined by the alloy forming the workpieces. Since the workpieces are lifted and then shifted to the individual coils, there is no sliding of the workpieces over rails 42, 44. These rails are provided only for support of the workpieces within the coils themselves.

QUENCHING APPARATUS Q

After a workpiece has been inductively heated by apparatus H, it is then quench hardened in apparatus Q, which is schematically illustrated in FIG. 1 as including a tank 180 filled to a level 182 by an appropriate quenching liquid. Quenching apparatus Q includes two upper pedestals 190 at either end of tank 180. Each of these pedestals includes guide rollers 192 and a lower lifting cylinder 194 for lifting the rollers vertically to guide rails 74, 76 as they are shifted to the right, as shown in FIG. 1, to deposit a heated workpiece onto the first pedetal. A plurality of submerged mechanisms 200 rotate the workpieces B by an appropriate motor 210. To move the workpieces from the first pedestal, to each of the submerged mechanisms and then to the exit or second pedestal, there is provided a movable frame 220 which supports two upper nests 230 and two lower nests 240. Frame 220 is shifted vertically and horizontally within tank 180 for movement of the workpieces through the tank between the two pedestals which are above the liquid level and the plurality of submerged mechanisms which are below the liquid level.

Referring now more particularly to pedestal 190, a similar pedestal 190a is located at the exit end of tank 180. Since these two pedestals are substantially the same, only one will be described and this description will apply to the second pedestal 190a. Pedestal 190 is provided with fixed, parallel support rils 250, 252 for receiving a workpiece B as it exits from induction heating apparatus H. To deposit a workpiece on pedestal 190, cylinder 194 is actuated to lower rollers 192. Rails 74, 76 of apparatus H in a raised position bring a workpiece to the location above parallel rails 250, 252. Thereafter, the roller frame 254 is raised to remove a heated workpiece from rails 74, 76. The rails are lowered and retracted, and frame 254 is lowered by cylinder 194 to deposit a heated workpiece an pedestal 190 in an initial position above liquid level 182. Similar rails will remove a workpiece from pedestal 190a by raising the rollers of the pedestal until transfer rails can be positioned under the workpiece. Thereafter, the rollers are lowered and the transfer elements are raised to lift the quenched workpiece from pedestal 190a and advance it in steps through annealing coils which are axially aligned as heating coils 10–16.

Figure 7:
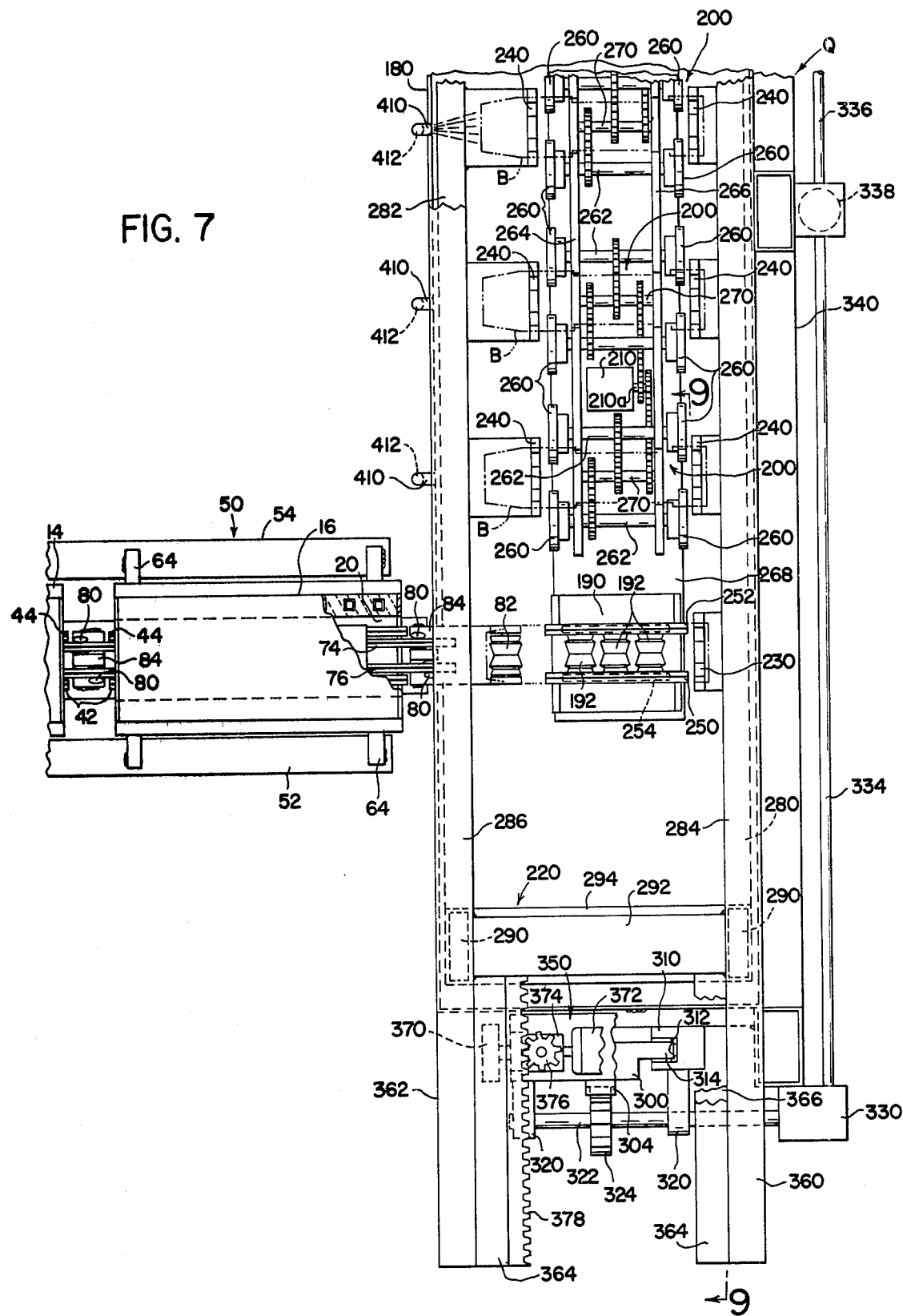
FIG. 7 is an enlarged, partial top elevational view, somewhat in cross-section, taken generally along line 7—7 of FIG. 2.
Figure 8:
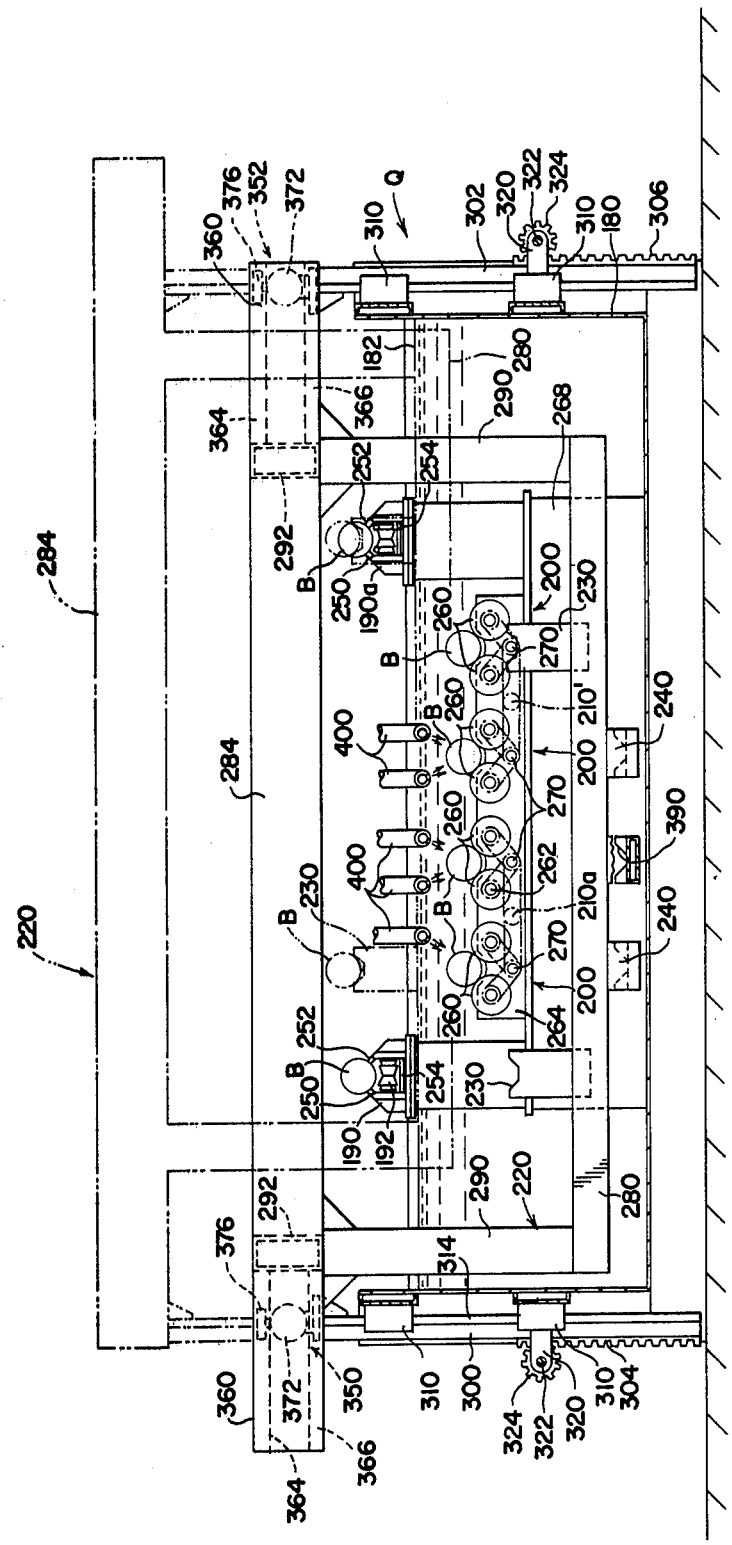
FIG. 8 is a side elevational view, showing somewhat schematically, the quenching unit used in the preferred embodiment of the present invention and taken generally along line 8—8 of FIG. 2; and, FIG. 9 is an enlarged, partial view taken generally along line 9—9 of FIG. 7 and showing the left hand portion of the quenching unit as illustrated in FIG. 8.

The submerged mechanisms 200 are used to rotate workpieces B below level 182 of liquid in tank 180. A variety of mechanisms could be used for this purpose; however, in accordance with the illustrated embodiment of the invention, rotating wheels 260 engage and support a workpiece at each submerged mechanism 200. By rotating wheels 260, the workpieces are rotated about their central axes. These wheels are supported on shafts 262 extending between fixed plates 264, 266 which, in turn, are supported on a lower support 288 which also supports pedestals 190, 190a. A variety of structures could be used for rotating wheels 260; however, as illustrated, motor 210 has an output shaft 210a, and a second motor (not shown) has an output shaft 210', as shown in FIGS. 7 and 8. A reversing shaft 270 is positioned between each of the wheel shafts 262 for rotating the wheels in the desired direction for continuous rotation of the workpieces below liquid within tank 180. The shafts and wheels used in conjunction with the submerged mechanisms 200 are interconnected by chains and sprockets, as shown in FIGS. 7-9, so that they are rotated by one or more motors submerged within the liquid of tank 180.

Figure 5:
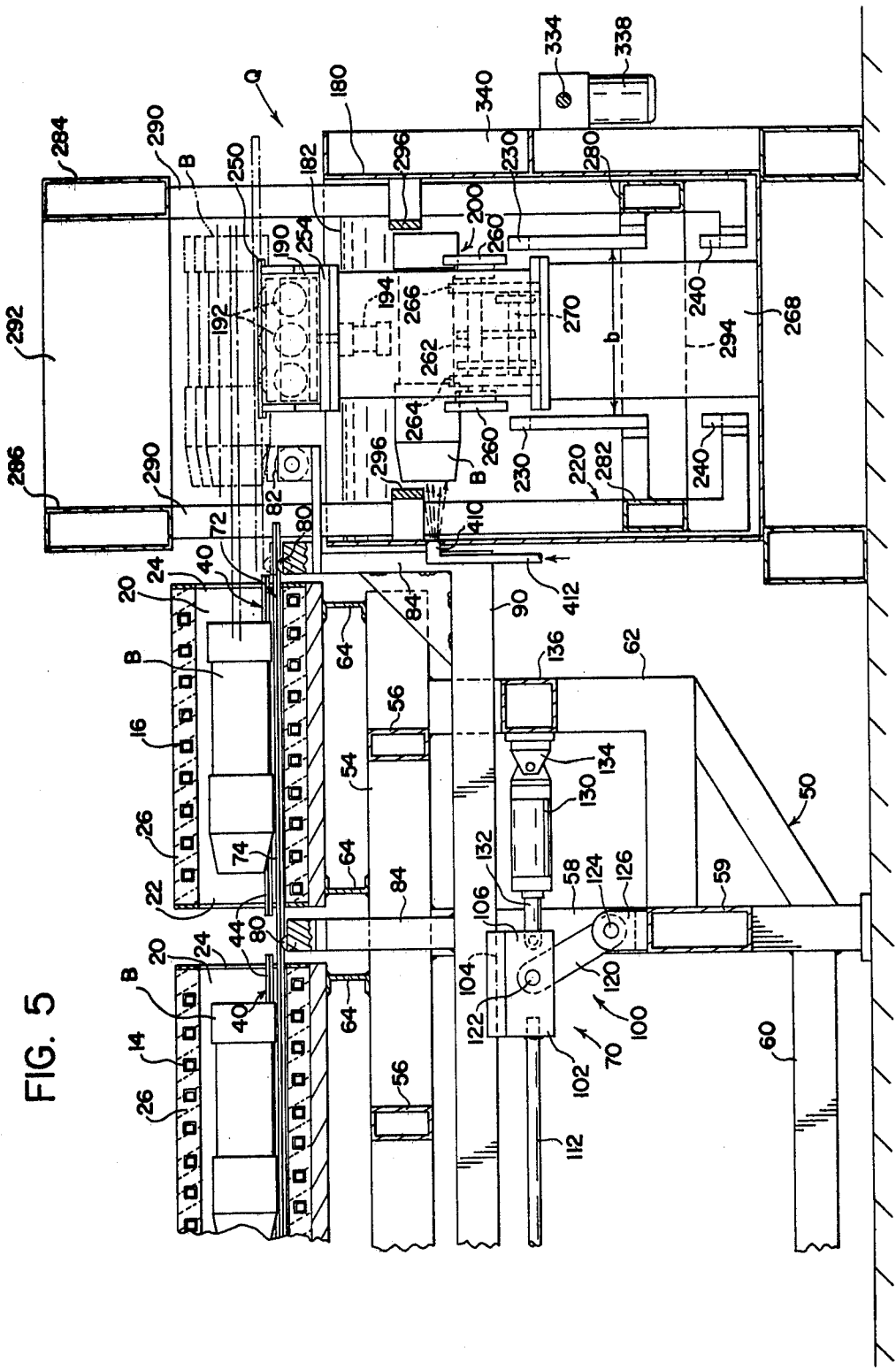
FIG. 5 is a partial, cross-sectional view, showing still a further portion of the preferred embodiment as illustrated in FIG. 2.

Referring now more particularly to movable frame 220, this frame includes lower spaced, longitudinally extending beams 280, 282 and upper spaced, longitudinally extending beams 284, 286. Vertical beams 290 connect the longitudinal beams into two separate side frames which are connected by upper cross beams 292 and lower cross beams 294. As shown in FIG. 5, transversely extending guide plates 296 allow both vertical movement of frame 220 and transverse movement of the frame longitudinally within tank 180.

To accomplish vertical shifting of frame 220 between an upper position wherein the workpieces are supported on the nests 230, 240 and a lower position where the workpieces are supported on the pedestals and submerged mechanisms, two depending arms 300, 302 are secured onto the frame and extend along the outside of tank 180. Racks 304, 306 are secured in a vertical position on arms 300, 302, respectively. A plurality of guide blocks 310 fixed on the ends of tank 180 are used to guide arms 300, 302 for vertical movement with respect to tank 180. Grooves 312 of blocks 310 coact with ways 314 on the arms. In this manner, frame 220 is moved vertically by arms 300, 302. To accomplish this moving action, there are provided two spaced journals 320 on the lowermost guide blocks 310 at each end of tank 180. A shaft 322 carries a pinion 324 which is driven through a gear box 330 to rotate the pinion in engagement with the respective racks 304, 306. Shafts 334, 336 are driven by an externally mounted motor 338 supported on a frame 340 at one side of tank 180. Thus, as motor 338 is rotated, shafts 334, 336 drive gear boxes 330, two of which are used, to rotate shaft 322 and pinions 324. In this manner, the pinions drive blocks 304, 306 in a vertical direction determined by the direction of rotation of motor 338. Arms 300, 302 are thus moved in unison from a lower vertical position to an upper vertical position. These arms which are supported on frame 220 cause corresponding movement of the frame between two vertically spaced positions.

To shift frame 220 transversely of the workpieces, there is provided a first mechanism 350 incorporated at one end of frame 220 and a similar mechanism 352 incorporated at the opposite end of the frame. Since these two mechanisms operate in unison and are substantially the same, only one will be described. This description applies equally to the other. Each mechanism 350, 352 includes extensions 360, 362 of upper beams 284, 286, respectively. Vertically spaced guide flanges 364, 366 provide a space for support wheels 370 rotated by a motor 372 through a gear box 374, a pinion 376 and a rack 378 secured onto flange 364 of extension 362, as best shown in FIG. 9. In this manner, by actuating motors 372, frame 220 can be shifted in a longitudinal direction transverse of the axes of workpieces B.

The nests 230, 240 are supported on the frame 220 and are spaced from each other a distance b, as shown in FIG. 5. This distance is greater than the spacing between wheels 260, but less than the length of the workpiece so that the nests can move upwardly in pairs with the frame 220 from a position below the pedestals, in the case of nests 230, below the submerged mechanisms 200, in the case of nest 240, to a position above these respective elements within tank 180.

In operation, a heated workpiece is deposited on pedestal 190, as best shown in the solid line position of FIG. 8. Thereafter, frame 220 is shifted vertically by motor 338. This lifts the workpiece from pedestal 190. Thereafter, motors 372 shift frame 220 into the phantom line position shown in FIG. 8. In this position, a workpiece B removed from pedestal 190 is above the first submerged mechanism 200. Thereafter, motor 338 shifts frame 220 vertically downward into its lower position. This allows the nest 230 to deposit a workpiece onto the first submerged mechanism. Wheels 260 then rotate the workpiece in this lowered, submerged position. During this same action, the workpiece on any of the submerged mechanisms, except the last such mechanism, are shifted to the next successive submerged quenching mechanisms. A workpiece on the last submerged mechanism is raised by the second nest 230 and deposited onto the exit pedestal 190a. Nests 230 are movable vertically between a first position which supports a workpiece above pedestals 190, 190a and a second position below submerged mechanisms 200. Nests 240 are movable with frame 220 between a position above mechanisms 200 and a position below these mechanisms. When in the down or lowered position, frame 220 is shifted back to the solid line position shown in FIG. 8 by motors 372. This combined vertical and horizontal shifting action is continued to progress heated workpieces through tank 180 until they are quench hardened and ready to be deposited onto a subsequent processing line, which in practice is a tempering line similar to heating apparatus H, but with lower final temperatures. Rotation of the workpieces precludes build up of steam pockets on the heated surfaces. To further assist this operation, a plurality of nozzles 400 can be provided in tank 160 so that these nozzles can direct streams of quenching liquid against the surfaces of workpieces B as they are quenched. The arrangement and number of quenching nozzles used in agitating the quenching liquid adjacent the surfaces of the rotating workpieces can be varied to accomplish the necessary quenching operation.

In a similar manner, means can be provided for agitating the quenching liquid inside the rotating, hollow workpiece. One arrangement is illustrated in FIGS. 5 and 7, wherein nozzles 410 are directed toward the open ends of the workpieces and discharge jets of quenching liquid from supply lines 412 into the workpieces. These nozzles may be located at only the initial quenching positions. In addition, a perforated quenching tube could be extended into the rotating workpieces to provide internal liquid agitation.

Having thus defined the invention, it is claimed:

1. An apparatus for quench hardening an inductively heated, elongated, generally cylindrical workpiece having a central axis in a quench tank filled with a quenching liquid to a given level, said apparatus comprising: a frame member in said tank and having first, second and third workpiece receiving nests, each of said nests having means for supporting one of said workpieces with its central axis extending in a selected direction and said first and third nests being vertically above said second nest; first conveyor means for feeding a workpiece in said selected direction toward said tank and to a first support pedestal at a first location in said tank, said first support pedestal including means for supporting a workpiece above said liquid level; second conveyor means for discharging a workpiece in said selected direction away from said tank and from a second support pedestal at a second location in said tank, said second support pedestal including means for supporting a workpiece above said liquid level; at least first and second submerged means in said tank and spaced between said first and second support pedestals for supporting one of said workpieces with its axis extending in said selected direction; first moving means for shifting said frame member transversely of said selected direction between a first horizontal position with said first nest at said first location and said second and third nests each aligned with a submerged means and a second horizontal position with said third nest at said second location and said first and second nests each aligned with a submerged means; a second moving means for shifting said frame member between a first vertical position with said first and third nests above said liquid level and above said support pedestals whereby a workpiece aligned with said first and third nests are raised to a level above said support pedestals and a second vertical position with said nests below said submerged means whereby a workpiece on each of said nests is deposited on a pedestal or submerged means aligned with each of said nests as said second moving means shifts said frame member between said first and second vertical positions; and means for causing said first moving means to move from said first horizontal position to said second horizontal position when said frame member is in said first vertical position and means for causing said first moving means to shift from said second horizontal position to said first horizontal position when said frame member is in said second vertical position.

2. An apparatus as defined in claim 1 wherein there are three of said submerged means.

3. An apparatus as defined in claim 1 wherein said submerged means each include means for rotating said workpiece about said central axis.

* * * * *